United States Patent [19]
Johnson

[11] Patent Number: 5,189,001
[45] Date of Patent: Feb. 23, 1993

[54] CATALYTIC DISTILLATION STRUCTURE

[75] Inventor: Kenneth H. Johnson, Missouri City, Tex.

[73] Assignee: Chemical Research & Licensing Company, Pasadena, Tex.

[21] Appl. No.: 763,525

[22] Filed: Sep. 23, 1991

[51] Int. Cl.$^5$ .......................... B01J 31/08; B01J 35/04
[52] U.S. Cl. .................................... 502/159; 502/527; 203/DIG. 6
[58] Field of Search .............................. 502/527, 159; 203/DIG. 6

[56] References Cited

U.S. PATENT DOCUMENTS

| | | | |
|---|---|---|---|
| 4,215,011 | 7/1990 | Smith | 252/426 |
| 4,232,177 | 11/1980 | Smith | 585/324 |
| 4,242,530 | 12/1980 | Smith | 585/510 |
| 4,250,052 | 2/1981 | Smith | 252/426 |
| 4,302,356 | 11/1981 | Smith | 252/426 |
| 4,307,254 | 12/1981 | Smith | 568/697 |
| 4,336,407 | 6/1982 | Smith | 568/679 |
| 4,439,350 | 3/1984 | Jones | 502/527 |
| 4,443,559 | 4/1984 | Smith | 502/527 |
| 4,482,775 | 11/1984 | Smith | 585/671 |

*Primary Examiner*—W. J. Shine
*Attorney, Agent, or Firm*—Kenneth H. Johnson

[57] ABSTRACT

A catalytic distillation structure which comprises a catalyst component having a porous container having disposed therein, solid particulate catalytic material which swells in use intimately admixed with from 5 to 60 volume % of a deformable material. The catalyst component may be in intimate association with or surrounded by a resilient component, which is comprised of at least 70 volume % open space.

12 Claims, 1 Drawing Sheet

CATALYTIC DISTILLATION STRUCTURE

BACKGROUND OF THE INVENTION

1. Field of the Invention

The present invention relates to an improvement in the distillation structures used in the process of catalytic distillation. More particularly the invention relates to the distillation structures using catalyst particles which change shape and/or size.

2. Related Art

A new method of carrying out catalytic reactions has been developed, wherein the components of the reaction system are concurrently separable by distillation, using the catalyst structures as the distillation structures, the method being commonly referred to as Catalytic Distillation. Such systems are described variously in U.S. Pat. Nos. 4,215,011; 4,232,177; 4,242,530; 4,302,356; 4,307,254; 4,336,407; 4,439,350; 4,443,559; and 4,482,775.

Briefly, a preferred and commercial catalyst structure described in the above patents comprises a cloth belt with a plurality of pockets spaced along the belt and containing particulate catalyst material, said cloth belt being wound in a helix about a spacing material such as stainless steel knitted mesh. These units are then disposed in the distillation column reactor. In addition, U.S. Pat. Nos. 4,443,559 and 4,250,052 disclose a variety of catalyst structures for this use and are incorporated herein.

Some particulate catalyst materials tend to swell and contract under various conditions. For example, cation exchange resins swell in contact with hydrocarbons. The arrangement of the catalyst particles in cloth pockets as described in the above cited patents, does allow for some expansion within the pockets, however, the catalysts particles at the bottom of vertically positioned catalyst units is constricted by the catalyst above them in the pocket

SUMMARY OF THE INVENTION

Briefly, the present invention is an improvement in catalyst structure for use in reaction-distillation column which comprises a catalyst component comprising a closed container containing particulate catalytic material, wherein the improvement is the intimate commingling of a deformable material with said particulate catalytic material in an amount sufficient to allow swelling and expansion of said particulate catalytic material. The deformable material may be catalytic or substantially inert. Preferably the container is surrounded by a spacing component, preferably a resilient spacing component.

Preferably the deformable material does not swell or expand in the presence of the liquid or gaseous material with which is contacted in the catalyst structure. The deformable material may be resilient, so that it is compressed or reshaped or it may be collapsible and friable, so that it does not regain its original configuration when the compressive force is removed.

The deformable material may be particulate and range in size from 0.15 to 1 mm, i.e., basically the range of catalytic material particle size. The deformable material particles do not need to be the same size as the catalytic material particles, although that expedient will make handling simpler. TEFLON beads or ground particles may be utilized in this manner. The use of a deformable material according to the present invention reduces the force on the container, e.g., cloth pockets in two ways. First the deformable material acts as a diluent to reduce the volume of expandable material in a pocket and secondly the resilient character of the material absorbs some of the force from the remaining expanding catalyst particles.

The deformable material may also be a fibrous mass, which may function as a matrix. Suitable materials include fiber glass and TEFLON, fine hair like filaments, preferably fibrillated which enhances the cushioning effect of the fibers. Fibers could be 1 millimeter to several centimeters long.

Any amount of the deformable material, preferably from 5 to 60 volume % more preferably 10 to 40 volume %, intimately mixed into the catalyst particles in the container will give benefit. However, replacing less than 10 volume % of the catalytic particles may not provide a safety margin to justify the additional manufacturing cost and loss of catalytic volume. Replacement of over 60 volume % of the catalytic material with deformable filler, may be too much of a reduction in catalytic material volume and can result in additional capital expenses, which the improvement may not justify. Generally replacement of catalytic particles in a container will require additional containers to provide the requisite catalytic volume for the reactor in question, however, improvement in the fluid flow through the catalyst in the pockets, e.g., from the fiber matrix may reduce the necessary catalyst volume for a given feed, set of conditions and the like as compared to the prior catalyst structure.

Thus the catalytic distillation structure of the present invention comprises:
 (a) a catalyst component comprising
  (i) a porous container having disposed therein
  (ii) solid particulate catalytic material intimately admixed with
  (iii) a deformable component;
said catalytic component in intimate association with or surrounded by
 (b) a resilient component, which is comprised of at least 70 volume % open space.

The resilient component and the deformable component may be the same or similar materials, however, in most embodiments they will be very different materials sharing only the tendency for resilience.

The term "deformable" as used herein mean the property or capacity to yield or give way to the force exerted by the expanding or swelling catalyst particles. A resilient material preferably resumes its original shape and size if the catalyst returns to it original smaller size. However, in use it is unlikely the catalytic material will shrink, hence the deformable component may be a rigid structure, that collapses preferentially to rupturing the container as the expanding catalyst pressures it. Thus the deformable material will exhibit a lower compressive strength than the tensile strength of the container. Examples of resilient materials are Teflon or fiberglass mats and reticulated polymer foams and examples of non resilient materials are perlite and reticulated ceramic foams.

DETAILED DESCRIPTION OF THE INVENTION

Figure 1:
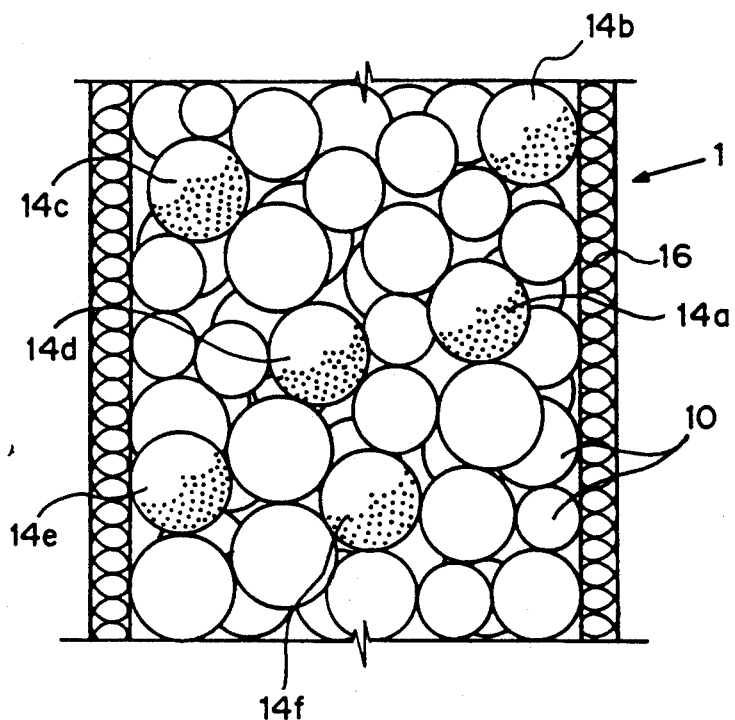
FIG. 1 is an enlarged partial cross sectional view of a container surrounded by a spacing component filled with a cation exchange resin beads and having interspaced therein a reticulated or open material.

Acid cation exchange resins which exhibit swelling include those which contain sulfonic acid groups, and which may be obtained by polymerization or copolymerization of aromatic vinyl compounds followed by sulfonation. Examples of aromatic vinyl compounds suitable for preparing polymers or copolymers are: styrene, vinyl toluene, vinyl naphthalene, vinyl ethyl benzene, methyl styrene, vinyl chlorobenzene and vinyl xylene. A large variety of methods may be used for preparing these polymers; for example, polymerization alone or in admixture with other monovinyl compounds, or by crosslinking with polyvinyl compounds; for example, with divinyl benzene, divinyl toluene, divinylphenylether and others. The polymers may be prepared in the presence or absence of solvents or dispersing agents, and various polymerization initiators may be used, e.g., inorganic or organic peroxides, persulfates, etc.

The sulfonic acid group may be introduced into these vinyl aromatic polymers by various known methods; for example, by sulfating the polymers with concentrated sulfuric and chlorosulfonic acid, or by copolymerizing aromatic compounds which contain sulfonic acid groups (see e.g., U.S. Pat. No. 2,366,007). Further sulfonic acid groups may be introduced into the polymer which already contain sulfonic acid groups; for example, by treatment with fuming sulfuric acid, i.e., sulfuric acid which contains sulfur trioxide. The treatment with fuming sulfuric acid is preferably carried out at 0 to 150. C. and the sulfuric acid should contain sufficient sulfur trioxide so that it still contains 10 to 50% free sulfur trioxide after the reaction. The resulting products preferably contain an average of 1.3 to 1.8 sulfonic acid groups per aromatic nucleus. Particularly, suitable polymers which contain sulfonic acid groups are copolymers of aromatic monovinyl compounds with aromatic polyvinyl compounds, particularly, divinyl compounds, in which the polyvinyl benzene content is preferably 1 to 20% by weight of the copolymer (see, for example, German Patent Specification 908,240). The ion exchange resin is generally used in a granular size of about 0.25 to 1 mm, although particles from 0.15 mm up to about 2 mm may be employed. The finer catalysts provide high surface area, but could also result in high pressure drops through the reactor requiring higher vapor velocities to agitate the catalyst. The macroreticular form of these catalysts have much larger surface area exposed and limited swelling which all of these resins undergo in a non-aqueous hydrocarbon medium compared to the gelular catalysts. The particulate resins are employed by enclosing them in a porous container such as cloth, screen wire or polymeric mesh. The material used to make the container must be inert to the reactants and conditions in the reaction system. The cloth may be any material which meets this requirement such as cotton, fiber glass, polyester, nylon, and the like. The screen wire may be aluminum, steel, stainless steel and the like. The polymer mesh may be nylon, Teflon or the like. The mesh or threads per inch of the material used to make the container is such that the catalyst is retained therein and will not pass through the openings in the material.

The container employed to hold the catalyst particles may have any configuration, such as the pockets in a belt disclosed above or the container may be a single cylinder, sphere, doughnut, cube, tube or the like.

A catalytic component comprises a container containing a solid catalytic material and the deformable material. Preferably each catalyst component is intimately associated with a spacing component which is comprised of at least 70 volume % open space up to about 95 volume % open space. This component may be rigid or resilient or a combination thereof. The combination of catalyst component and spacing component form the catalytic distillation structure. Alternatively the catalyst components can be spaced apart by holders or by surface configuration of the container. The total volume of open space for the catalytic distillation structure should be at least 10 volume % and preferably at least 20 volume % up to about 65 volume %. Thus desirably the spacing component or material should comprise about 30 volume % of the catalytic distillation structure, preferably about 30 volume % to 70 volume %. Resilient materials are preferred. One suitable such material is open mesh knitted stainless wire, known generally as demister wire or an expanded aluminum. Other resilient components may be similar open mesh knitted polymeric filaments of nylon, Teflon and the like. Other materials such as highly open structures foamed material, e.g., reticulated polyurethane foam (rigid or resilient) may be formed in place or applied around the catalyst component.

It is not essential that the spacing component, entirely cover the catalyst component. It is only necessary that the spacing component intimately associated with the catalyst component will act to space the various catalyst components away from one another as described above. Thus, the spacing component provides in effect a matrix of substantially open space in which the catalyst components are randomly but substantially evenly distributed.

A preferred catalytic distillation structure for use herein comprises placing the resin particles intimately admixed with from 20-60% of the deformable component, e.g. a resilient material, into a plurality of pockets in a cloth belt, which is supported in the distillation column reactor by open mesh knitted stainless steel wire by twisting the two together in a helical form. This allows the requisite flows and prevents loss of catalysts. The cloth may be any material which is inert in the reaction. Cotton or linen are useful, but fiber glass cloth or "Teflon" cloth are preferred.

The resilient deformable material of the present invention may be open-celled or reticulated type foams. The foams may be foamed and cut into pieces which fit into the container or foamed and ground to a particle size convenient for loading into the container with the catalyst particles. The open-celled foams are preferably produced from high molecular weight polymers, i.e., molecular weight of 20,000 to 3,000,000. The term polymer is used to describe both homopolymers and copolymers.

Suitable open-celled foams which may be employed are epoxy resin, silicone resin, polyurethane resin, polystyrene resin, urea-formaldehyde resin, phenol-formaldehyde resin, styrene-butadiene copolymer, butadiene-styrene-acrylonitrile copolymer and the like. The foams employed may be rigid, semirigid or elastomeric although the semirigid or elastomeric are preferred.

The foamed plastics of the present invention should have as much open-celled structure as possible in order to allow deformation and to allow the gases to pass through easily. A foam that has a large percent of closed cells may be made operable for use according to the present invention by physical methods such as by grinding or crushing or chemical methods such treatment with strong base so that the closed-celled structure is substantially destroyed.

The size of pores in the open-celled foam is not critical but should be in the range of from 0.05 to 20 mm. The open-celled foams may be produced by any of the methods known and described in the prior art such as those found on pages 36 to 205 of "Plastic Engineering Handbook" 3rd edition, Reinhold Publishing Corp., New York, 1960; U.S. Pat. Nos. 3,165,483 and 3,171,820.

When foamed or friable material is packed into the container with the catalyst only a moderate pressure should be applied to pack it uniformly in order to avoid crushing the cell structure.

In addition to being resilient and providing an area into which the swelling resin can expand, the open celled or reticulated polymer foams may provide a lattice within the container which serves to space the catalyst particles within the container apart in the same manner as the resilient spacing component surrounding each container spaces the containers apart.

A preferred catalyst packing consisted of bags in the form of a fiber glass cloth belt approximately 6-40 inches wide with narrow pockets approximately ⅜-1⅜ inches wide sewn across the belt. The pockets are spaced about 1/4 inch apart. These pockets are filled with the catalytic particles/deformable material particle mixture to form approximately cylindrical containers, and the open ends are then sewn closed to confine the particles. This belt is then twisted into a helical form to fit inside the column. Twisted in with the belt is also a strip of an open mesh knitted stainless steel wire, which serves to separate the filled cloth pockets and provide a passage for vapor flow.

In commercial-scale operations, the height of a section of this packing should be of any convenient dimension, from a few inches to several feet. For ease of assembly and installation, the packing would be made into sections of the desired shape and size, each section fastened together with circumferential bands of tie wires depending on its size and shape. A complete assembly in a column would consist of several sections, arranged in layers, with possibly the orientation of the catalyst-filled belts turned at right angles in successive layers to improve liquid and vapor flow distribution.

Figure 2:
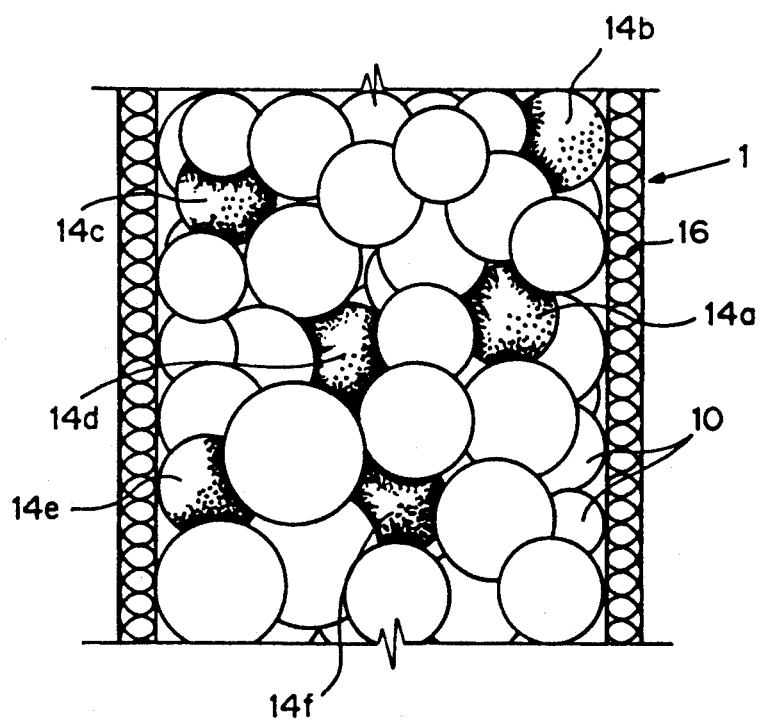
FIG. 2 corresponds to the structure of FIG. 1 after exposure of the resin catalyst to a hydrocarbon and swelling of the resin to collapse the reticulation foam.

FIG. 1 shows a cross sectional view of a container 1, e.g. a cloth bag or pocket filled with beads of cation exchange resin 10 having intimately throughout about 13 vol. deformable material, e.g. reticulated silicon or polyurethane foam ground or perlite into particles 14a-14f about the same size as the beads. There is a spacing material 16 surrounding the container and the entire figure represents a catalytic distill structure 1. The resin beads are tightly packed but are not enlarged. FIG. 2 shows a corresponding container in which the resin beads have contacted a material, i.e., gas or liquid which has caused the beads 10 to swell and enlarge. The deformable material 14a-f has collapsed preferentially to absorb the enlarged beads and thus has protected the container from splitting or tearing.

The invention claimed is:

1. An improvement in a catalyst structure for use in a reaction-distillation column which comprises a catalyst component comprising a closed container containing particulate cation exchange resin catalytic material, wherein the improvement is the intimate commingling of a deformable material with said particulate cation exchange resin catalytic material in an amount sufficient to allow swelling and expansion of said particulate catalytic material.

2. A catalytic distillation structure which comprises:
   (a) a catalyst component comprising
      (i) cloth belt having closed cloth pockets arranged therealong said pockets having disposed therein
      (ii) solid particulate cation exchange resin catalytic material intimately admixed with
      said catalyst component in intimate association with or surrounded by
   (b) a resilient component, which is comprised of at least 70 volume % open space.

3. The catalytic distillation structure according to claim 2 wherein said deformable material comprises fibers.

4. The catalytic distillation structure according to claim 2 wherein said deformable material comprises reticulated polymeric foam.

5. The catalytic distillation structure according to claim 2 wherein said deformable material comprises open-celled polymeric foam.

6. The catalytic distillation structure according to claim 4 wherein said deformable material comprises a rigid material.

7. The catalytic distillation structure according to claim 4 wherein said deformable material comprises a semirigid material.

8. The catalytic distillation structure according to claim 2 wherein said deformable material comprises an elastomeric material.

9. The catalytic distillation structure according to claim 2 wherein said deformable material comprises particles in the same range of particle size as said catalytic material.

10. The catalytic distillation structure according to claim 2 wherein said belt comprises fiber glass.

11. The catalytic distillation structure according to claim 10 wherein said deformable material comprises reticulated or open-celled foamed polymeric material.

12. The catalytic distillation structure according to claim 2 wherein said deformable material comprises 5 to 60 volume % of the total of catalytic material and resilient material.

* * * * *